United States Patent [19]

Ford

[11] Patent Number: 4,685,330
[45] Date of Patent: Aug. 11, 1987

[54] POSITION SELECTABLE DELAY GENERATOR FOR MECHANISM TRIGGER

[76] Inventor: Lindy R. Ford, 7900 S. Phillips Ave., Yuma, Ariz. 85364

[21] Appl. No.: 841,380

[22] Filed: Mar. 12, 1986

[51] Int. Cl.$^4$ .............................................. G01P 3/64
[52] U.S. Cl. ....................................... 73/167; 102/293
[58] Field of Search ............... 73/167; 356/28; 377/20

[56] References Cited

U.S. PATENT DOCUMENTS

| 4,129,829 | 12/1978 | McLellan | 73/167 X |
| 4,137,566 | 1/1979 | Haas et al. | 73/167 X |
| 4,155,647 | 5/1979 | Michel | 73/167 X |
| 4,379,405 | 4/1983 | Engeler et al. | 73/167 |

*Primary Examiner*—Daniel M. Yasich
*Attorney, Agent, or Firm*—Saul Elbaum; Alan J. Kennedy; Thomas E. McDonald

[57] ABSTRACT

Two sensors are mounted a distance "a" apart near the muzzle of a gun barrel. The first position sensor generates a signal which initiates a binary count, upward from zero at a clock frequency, when the projectile passes the first point. The second sensor generates a signal which reverses the direction of count, at a preselected submultiple of the clock frequency. The time required to return the count to zero is an integer multiple of the time required for the projectile to travel from the first sensor to the second sensor. Thus, the distance that the projectile travels will be an integer multiple of the distance "a" between the sensors. The velocity of the projectile remains relatively unchanged over the specified distance. The signal that is generated when the counter returns to zero may be used to trigger a monitoring device located at the specified point in front of the muzzle when the projectile passes that point.

12 Claims, 2 Drawing Figures

POSITION SELECTABLE DELAY GENERATOR FOR MECHANISM TRIGGER

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to a position selectable delay generator having particular application as a trigger mechanism for ballistic monitoring devices.

BACKGROUND OF THE INVENTION

In ballistic testing it is desirable to monitor and observe the flight characteristics of fired projectiles as they travel along their trajectories. It is especially important to monitor projectiles at certain preselected locations in close proximity to a gun muzzle. In a wide variety of conventional testing devices, use is made of a fixed time delay generator for detecting the estimated presence of a projectile after a gun is fired. However, such conventional equipment is prone to generate errors at a preselected location due to different velocities of a series of projectles fired from the same gun tube. Such errors increase as the distance to the monitoring location increases from the muzzle.

BRIEF DESCRIPTION OF THE PRESENT INVENTION

The purpose of the present invention is to overcome the disadvantages of the discussed prior art by providing an adjustable time delay generator which takes into account varying velocities of projectiles fired from the same gun tube. The present invention generates an electrical signal when a projectile arrives at a predetermined location along its trajectory, generally within a few feet of the muzzle. More specifically, by virtue of the present invention, an electrical trigger or synchronizing pulse for a monitoring apparatus is generated when a projectile passes the monitoring apparatus location, regardless of the muzzle velocity.

This is accomplished by measuring the time that it takes a projectile to travel over a known distance near the muzzle where the velocity for a given projectile remains substantially constant and then generating a delay signal extrapolated to the location where the projectile is to be monitored. The advantage of this technique is that the expected velocity of the projectile need not be known in order to set a precise time delay corresponding to the desired distance. More importantly, muzzle velocity may vary from one projectile to another and the present system will adjust the time delay to compensate for the variation.

A system for accomplishing this goal comprises two sensing means separated by a predetermined distance along the projectile trajectory for detecting the presence of the projectile at a monitoring location. When the projectile reaches the first sensing means, a counter starts to count up from an initial count at an undivided frequency. The undivided frequency is provided by a clock. The counting continues until the projectile reaches a second sensing means. The value of the count at this point corresponds to the velocity of the object. The counting means is immediately reversed, counting back at a divided frequency until the count again reaches its initial value which is indicative of the presence of the projectile at the desired monitoring location along the trajectory. The division factor of the divided frequency is proportional to the distance between the second sensing means and the monitoring location. According to the present invention, the unkown velocity of the projectile is determined during the time interval when it moves a known distance between first and second sensing means and by generating a subsequent time delay corresponding to the distance from the second sensing means to the desired monitoring location.

In the following discussion and description, emphasis is placed upon the application of the invention to the monitoring of projectiles moving along their trajectories. It is to be understood, however, that the invention is not so limited in application and could be applied to other uses such as monitoring moving objects along their paths to trigger cameras at some preselected location along the movement path. A common requirement for various applications of the invention is that the object travel at a substantially constant velocity between the sensing means and the monitoring location.

BRIEF DESCRIPTION OF THE DRAWINGS

The above-mentioned objects and advantages of the present invention will be more clearly understood when considered in conjunction with the accompanying drawings, in which.

DETAILED DESCRIPTION OF THE INVENTION

Figure 2:
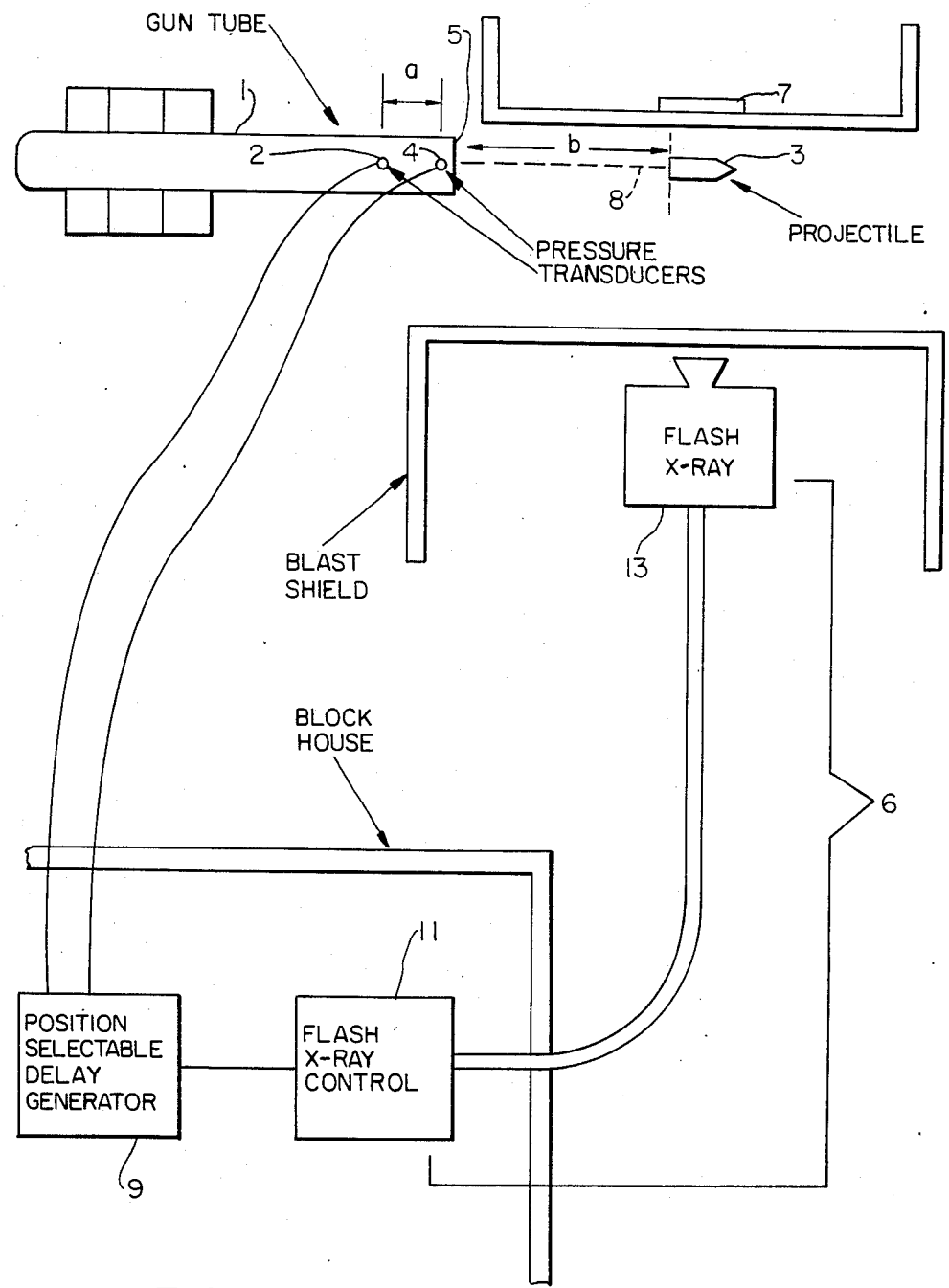
FIG. 2 shows a typical test configuration for the invention using flash X-ray.

Referring to FIG. 2 a typical test configuration is shown using a flash X-ray machine 6. The invention is applied to trigger the conventional flash X-ray machine 6 when a projectile 3 passes between the film plate 7 and the X-ray source 13. The flash X-ray machine 6 or other suitable monitoring device is placed at some preselected location along the trajectory 8 of the projectile 3, typically 1-15 feet from the muzzle 5, in increments of one foot. Sensors 2 and 4 are mounted along the path of the projectile, inside gun tube 1. In the preferred embodiment of the present invention, sensors 2 and 4 are piezoelectric type pressure transducers that are mounted a distance "a" apart, preferably with sensor 4 located approximately one inch from muzzle 5. The sensors could also be, for example, of the optical type.

The position selectable delay generator 9 is connected between the outputs of sensor 2 and 4 and the input of flash X-ray control unit 11 and will adjust the delay time to generate a trigger signal for the X-ray machine 6. The delay is determined by the input signals obtained from sensors 2 and 4 so that, regardless of the change in muzzle velocity of a subsequently fired projectile measured when it passes distance "a" between sensors 2 and 4, it would always be detected by flash X-ray 6 in the same preselected location approximately 1-15 feet from muzzle 5. This is due to the physical fact that the projectile substantially maintains its exit or muzzle velocity for approximately 15 feet from the muzzle end.

Figure 1:
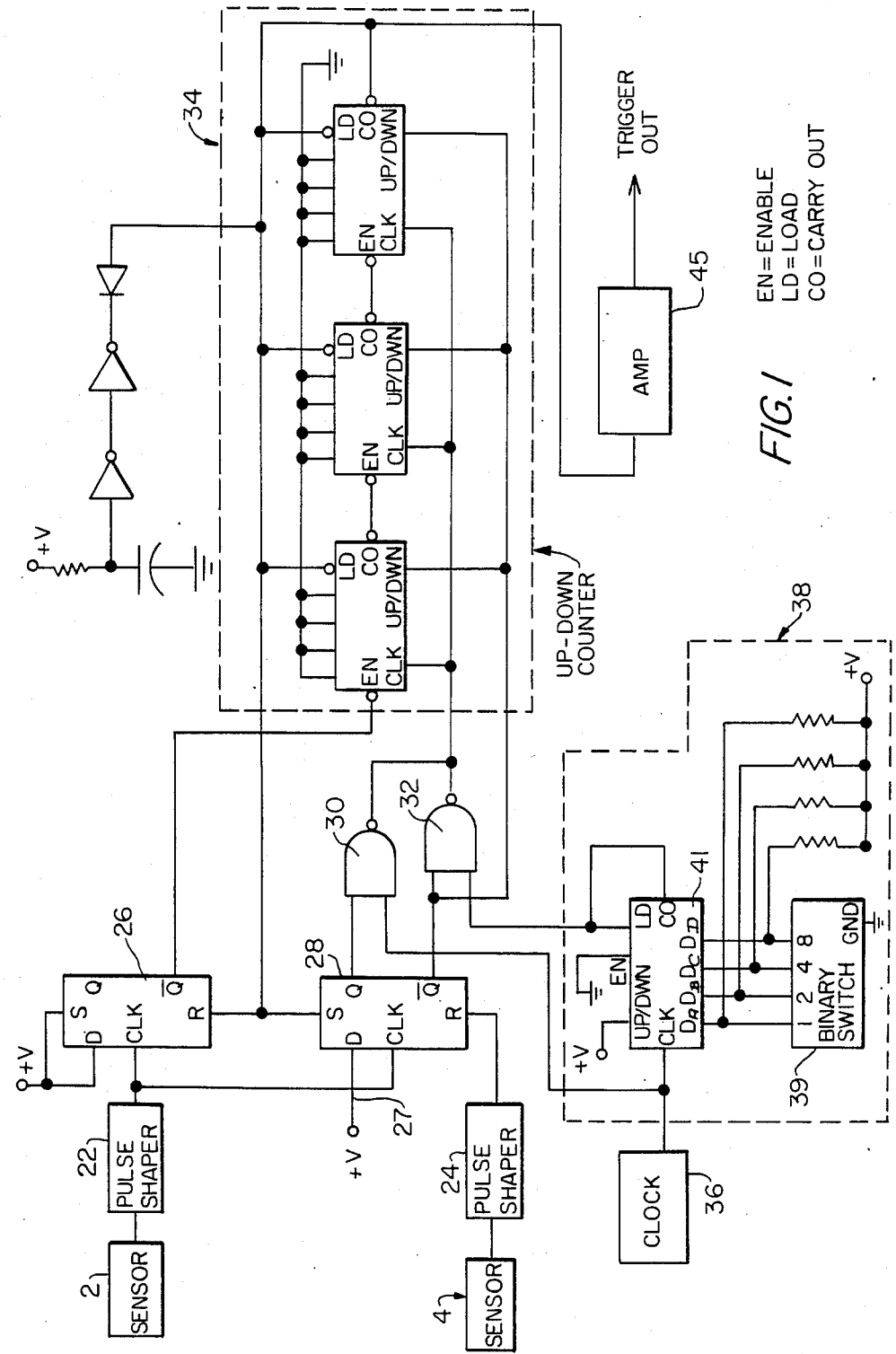
FIG. 1 shows a schematic diagram of a position selectable delay generator.

The operation of the delay generator 9 can be clearly unhderstood from the following description in connection with FIG. 1. Impulses produced by sensors 2 and 4 are supplied to conventional pulse shaper circuits 22, 24 where they are changed to digital level signals.

When power is supplied to the circuit, flip-flops 26 and 28 reset; and binary up-down counter 34 initializes all its stages to zero. The Q and $\overline{Q}$ outputs of flip-flop 28 steer the NAND gates 30 and 32 in such a manner that the undivided frequency from clock 36 is gated to the binary counter 34. At the same time the $\overline{Q}$ from flip-flop 28 also sets the binary counter 34 in a count up mode. However, the $\overline{Q}$ output from flip-flop 26 blocks the binary counter from counting.

When a projectile is detected by the first sensor 2, a signal from the sensor is amplified and shaped by the shaper circuit 22 to a digital level and applied to flip-flops 26 and 28. At this time both of the flip-flops 26, 28 are clocked. Flip-flop 28 will not change state since its input 27 is high and the flip-flop is already in a set condition. However, flip-flop 26 will toggle and the $\overline{Q}$ output thereof will switch to a low state and enable the binary counter 34 to begin counting up at the undivided clock frequency provided from clock 36. The binary bidirectional counter 34 continues counting until projectile 3 reaches the second sensor 4 and the resultant second signal is input to shaper circuit 24. At this time the input from circuit 24 resets flip-flop 28. Output Q of this flip-flop switches to a low state and turns off NAND gate 30; output $\overline{Q}$ of flip-flop 28 switches to a high state enabling the NAND gate 32 so that a divided frequency is provided to the binary counter through divider 38. The divider 38 shown in FIG. 1 incorporates a presettable, up-down binary counter section 41 with a connected thumb wheel switch 39 for adjusting the division factor. The preset division factors set in the divider 38 correspond to the increments of the distance between the second sensor 4 and the location at which the projectile is to be monitored. As previously mentioned, it typically varies from 1–15 feet and is designated in FIG. 2 as distance "b". At the same time, when the output from pulse shaper 24 is provided to flip-flop 28, the $\overline{Q}$ output from flip-flop 28 sets the binary counter 34 in a count down mode. The binary counter begins counting down at the divided frequency until it reaches an initial zero count indicative of the presence of the projectile at the predetermined location. When the initial zero count is reached, an output signal is generated by the last stage of binary counter 34 where it undergoes amplification at 45 to initiate the delayed trigger signal for actuating the X-ray control 11. The zero count also resets the binary counter and the flip-flops to their initial condition, in preparation for the next operation.

The following simplified example illustrates the operation and advantages of the above described system. Assuming that the location of the flash X-ray for monitoring the moving projectile is stationed at six feet from the muzzle of the gun, the thumb wheel switch 39 is accordingly set to six; and the actual velocity of the projectile will be considered to be 4,500 feet per second, instead of an expected 5,000 feet per second. The time required for the projectile to pass from the first to the second sensor over the known distance of one foot would be:

$$\frac{1 \text{ ft}}{4,500 \text{ ft/sec}} = 222 \text{ microsec}$$

and the number of counts, at 5.8 MHz, would be:

$$222 \text{ microsec} \times 5.8 \text{ MHz} = 1,288 \text{ counts}$$

When the projectile reaches the second sensor, the direction of count reverses and the divided frequency is:

$$5.8 \text{ MHz}/6 = 966,666 \text{ Hz}$$

The time required to count from 1,288 down to zero at a frequency of 966,666 Hz is:

$$\frac{1,288 \text{ counts}}{966,666 \text{ counts/sec}} = 1,322 \text{ microseconds}$$

which is six times the time measured between first and second detected locations:

$$\frac{1,322 \text{ microseconds}}{6} = 222 \text{ microseconds}$$

Since the projectile is near maximum velocity in the last 12 inches of its travel between the first and second sensors in the gun tube and slow down is negligible in the first few feet after leaving the tube, the flash X-ray would "catch" the projectile six feet from the muzzle, regardless of its muzzle velocity. When the muzzle velocity of subsequent projectiles varies, it will be determined during the counting up period and then counting down will be adjusted by the frequency division factor corresponding to the preselected location of monitoring means.

If the same projectile were fired in a fixed time delay system, the time delay would be set to 1,200 microseconds. In 1,200 microseconds the projectile would travel 5.4 feet at the 4,500 feet per second velocity. The absolute error increases as the distance from the muzzle increases. At six feet the error is 7.2 inches. Because of the relative sizes of the film plates and the projectiles, the typical allowable error margin is approximately four inches.

Accordingly, the present invention offers means for accurately triggering a device for monitoring an object which moves along a path section at a substantially constant velocity.

It should be understood that the invention is not limited to the exact details of construction shown and described herein for obvious modifications will occur to persons skilled in the art.

I claim:

1. A system for producing an electrical signal at a preselected location along the path of a moving object, having a substantially constant velocity, said system comprising:
    first sensing means located along said path for detecting the presence of said object at a first location and producing a resultant first signal;
    second sensing means located at a preselected distance from said first sensing means for detecting the presence of said object at a second location and producing a resultant second signal;
    counting means having respective first and second inputs connected to said first and second signals;
    frequency means connected to a third input of said counting means for providing a preselected undivided frequency thereto;
    frequency dividing means connected between said output of said frequency means and a fourth input of said counting means;
    said counting means counting from an initial count value at said frequency from the occurrence of said first signal until the occurrence of said second signal, corresponding to the object velocity, said second signal initiating count down at said divided frequency, said counting means generating an output signal when the count returns to said initial count value;

means for generating said electrical signal in response to said output signal produced by said counting means, indicative of the presence of said moving object at said preselected location along the path; and means located at said preselected location for instantaneously monitoring the presence of said object thereat, whereby the divided frequency is adjustable to cause countdown to the initial count when said moving object arrives at said second location, causing said output signal to be produced when said object reaches said preselected location, regardless of the object velocity between said first and said second locations.

2. A system according to claim 1 in which a division factor of the divided frequency is proportional to the distance between said second sensing means location and said preselected location.

3. A system according to claim 2 in which said distance between said first and said second sensing means locations equals one foot and between said second and preselected locations equals 1-15 feet, in one foot increments.

4. A system according to claim 1 wherein said first and said second sensing means comprise piezoelectric sensors responsive to pressure wave generated by the moving object.

5. A method for generating an electric signal when a moving object, having a substantially constant velocity reaches a preselected location along its path, the method comprising the steps:

detecting the presence of said moving object at a first location along said path and producing a resultant first signal;

initiating an up count after the occurrence of said first signal, at a preselected undivided frequency, until said moving object reaches a second location along said path, wherein an accumulated count corresponds to the object velocity at the second location;

detecting the presence of said moving object at said second location which exists at a preselected distance from said first location, and producing a resultant second signal;

counting down at a divided frequency upon occurrence of said second signal until said count reaches an initial value; and generating an output signal when said initial value is reached, indicative of the presence of the object at the preselected location, displaced forwardly from the second location along the object path, said signal being utilized as a trigger signal for monitoring apparatus at the preselected location.

6. A method according to claim 5 in which a division factor of the divided frequency is proportional to a distance between said second location and said preselected location.

7. A system for producing an electrical signal to trigger a flash X-ray apparatus stationed at a preselected location along the trajectory of a projectile having a substantially constant velocity along a segment of the trajectory, said system comprising:

first sensing means located in a gun tube along said trajectory of said moving projectile for detecting the presence of said projectile at the first location and producing a resultant first signal;

second sensing means located in said gun tube at a preselected distance from said first means from detecting the presence of said projectile at a second location and producing a resultant second signal;

counting means having respective first and second inputs responsive to said first and second signals;

frequency means connected to a third input of said counting means for providing a preselected undivided frequency thereto;

frequency dividing means connected between said output of said frequency means and a fourth input of said counting means;

said counting means counting up from an initial count value at said frequency upon the occurrence of said first signal until the occurrence of said second signal corresponding to the velocity of the projectile, said second signal initiating counting down at said divided frequency, said counting means generating an output signal when the count returns to said initial count value;

means for generating said electrical signal in response to said output signal produced by said counting means indicative of the presence of said moving projectile at said preselected location; and means located at said third preselected location for instantaneously monitoring the presence of said projectile, whereby the divided frequency is adjustable to cause countdown to the initial count when said moving projectile arrives at said second location, causing said output signal to be produced when said object reaches said preselected location, regardless of the velocity of the projectile between said first and said second sensing means locations.

8. A system according to claim 7 in which the division factor of the divided frequency is proportional to the distance between said second sensing means location and said preselected location.

9. A system according to claim 8 in which said distance between said first and said second sensing means locations equals one foot and the distance between said second sensing means and preselected locations equals 1-15 feet in one foot increments.

10. A system according to claim 7 wherein said first and second sensing means comprise piezoelectric sensors responsive to the pressure wave generated by the moving object.

11. A method for generating an electric signal to trigger flash X-ray when a moving projectile, having a substantially constant velocity along a section of its trajectory, reaches a preselected location along its trajectory, the method comprising the steps:

detecting the presence of said projectile at a first location along its trajectory and producing a resultant first signal;

initiating an up count after the occurrence of said first signal at a preselected undivided frequency until said projectile reaches a second location along said trajectory wherein an accumulated count corresponds to the velocity of the projectile;

detecting the presence of said projectile at said second location which exists at a preselected distance from said first location and producing a resultant second signal;

counting down at a divided frequency upon the occurrence of said second signal until said count reaches an initial value; and generating an output signal when said initial value is reached; indicative of the presence of the projectile at the preselected location, displaced forwardly from the second location along the projectile path, said signal being utilized as a trigger signal for monitoring apparatus at the preselected location.

12. A method according to claim 11 in which a division factor of the divided frequency is proportional to a distance between said second location and said preselected location.

* * * * *

UNITED STATES PATENT AND TRADEMARK OFFICE
CERTIFICATE OF CORRECTION

PATENT NO. : 4,685,330

DATED : August 11, 1987

INVENTOR(S) : Lindy R. Ford

It is certified that error appears in the above-identified patent and that said Letters Patent is hereby corrected as shown below:

On the first page column 1 of the patent before "[21] application No.: 841,380," insert
-- [73] Assignee: The United States of America as represented by the Secretary of The Army, Washington, D.C.--

Signed and Sealed this

Fifteenth Day of August, 1989

Attest:

DONALD J. QUIGG

*Attesting Officer*  *Commissioner of Patents and Trademarks*